US011824832B2

(12) United States Patent
Dalvi et al.

(10) Patent No.: US 11,824,832 B2
(45) Date of Patent: Nov. 21, 2023

(54) PREVENTION OF MALICIOUS USE OF ENDPOINT DEVICES

(71) Applicant: Citrix Systems, Inc., Fort Lauderdale, FL (US)

(72) Inventors: Karan Jayant Dalvi, Pompano Beach, FL (US); Joseph L. Freedman, Parkland, FL (US); Jose Angel Lago Graveran, Boca Raton, FL (US)

( * ) Notice: Subject to any disclaimer, the term of this patent is extended or adjusted under 35 U.S.C. 154(b) by 194 days.

(21) Appl. No.: 16/995,929

(22) Filed: Aug. 18, 2020

(65) Prior Publication Data

US 2022/0060446 A1 Feb. 24, 2022

(51) Int. Cl.
*H04L 9/40* (2022.01)
*G06N 20/00* (2019.01)

(52) U.S. Cl.
CPC ......... *H04L 63/0236* (2013.01); *G06N 20/00* (2019.01); *H04L 63/101* (2013.01); *H04L 63/1425* (2013.01)

(58) Field of Classification Search
CPC ............... H04L 63/0236; H04L 63/101; H04L 63/1425; G06N 20/00; G06F 21/32
See application file for complete search history.

(56) References Cited

U.S. PATENT DOCUMENTS

| | | | | |
|---|---|---|---|---|
| 10,382,461 | B1 * | 8/2019 | Sharifi Mehr | ...... H04L 63/1425 |
| 10,402,546 | B1 * | 9/2019 | Qureshi | ................ H04L 9/0822 |
| 2016/0066189 | A1 * | 3/2016 | Mahaffey | .......... H04M 15/7652 |
| | | | | 455/405 |
| 2016/0210450 | A1 * | 7/2016 | Su | .......................... G06F 21/552 |
| 2016/0224777 | A1 * | 8/2016 | Rebelo | ................. G06F 21/6218 |
| 2017/0032114 | A1 * | 2/2017 | Turgeman | .............. H04W 4/027 |
| 2019/0052575 | A1 * | 2/2019 | Kaminski | ................ H04L 47/83 |
| 2019/0075168 | A1 * | 3/2019 | Goldfarb | .............. H04L 63/0272 |
| 2019/0114244 | A1 * | 4/2019 | Salunke | ................ G06F 11/079 |
| 2019/0171808 | A1 * | 6/2019 | Ho | ........................... G06F 16/22 |
| 2019/0342759 | A1 * | 11/2019 | Mahaffey | ................ G06F 21/88 |
| 2020/0153855 | A1 * | 5/2020 | Kirti | .................... H04L 63/1408 |

OTHER PUBLICATIONS

Title: Evaluation and Selection of Cloud Security Services based on Multi-Criteria Analysis MCA Author(s): Talal Halabi and Martine Bellaiche Date: 2017 Publisher: IEEE.*
Title: Increasing Performance of Intrusion Detection System Using Neural Network Author(s): Satendra kumarl and Anamika Yadav Date: 2014 Publisher: IEEE.*
"Mobile device management" Wikipedia https://en.wikipedia.org/wiki/Mobile_device_management website visited Aug. 10, 2020, pp. 1-5.

* cited by examiner

*Primary Examiner* — Shahriar Zarrineh
*Assistant Examiner* — Gita Faramarzi

(57) ABSTRACT

Methods and systems for preventing malicious use of endpoint devices are described herein. A computing device may receive data indicative of usage of the computing device by a user. The computing device may compare the received data with other data (indicative of how an authorized user for the computing device uses the computing device) stored on the computing device to identify instances of abnormal usage of the computing device. The computing device may detect unauthorized use of the computing device based on the number of instances of abnormal usage exceeding a threshold. The computing device may prevent access to a computing environment with use of the computing device in response to detection of unauthorized use.

19 Claims, 8 Drawing Sheets

PREVENTION OF MALICIOUS USE OF ENDPOINT DEVICES

FIELD

Aspects described herein generally relate to computer networking, enterprise mobility management, and hardware and software related thereto. More specifically, one or more aspects described herein provide enhanced computer security techniques to prevent malicious use of endpoint devices.

BACKGROUND

Endpoint devices (such as a cell phone) may be lost or stolen, and may be subject to unauthorized use. Such unauthorized use may cause significant harm, especially in an enterprise context. The unauthorized user may send phishing emails, access sensitive corporate data, cause disruption to business services (e.g., shut down services via a managed desktop), or perform other harmful activities. To address this problem, an authorized user may report the device as lost or stolen to the company's information technology (IT) department, at which point an administrator may lock the device, wipe corporate data from the device, perform a factory reset, invalidate an access token, refresh an access token to enforce re-authentication, lock a user account, force a password change, and/or perform other security measures.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

The inventors have recognized that administrator actions performed after loss of possession of endpoint devices are not completely effective to prevent harm from a malicious actor in possession of the lost or stolen asset. In fact, the unauthorized user (or an otherwise malicious actor) may still cause harm to the company (e.g., loss of confidential business data, breach in privacy information of employees, or the like) in the window of time between the device being lost or stolen and performance of the security measures by the administrator, which may, in some instances, be a significant amount of time. The time is often significant because of user delay in reporting the lost endpoint device. This delay can arise for a number of reasons including: inability to readily send communications upon realization that the device has been lost (e.g., lack of communication devices to report the loss or being a passenger on an airplane in which communications are limited), time lost by the authorized user looking for the device, and the authorized user being simply unaware that the device gone missing, just to name a few.

To overcome limitations described above, and to overcome other limitations that will be apparent upon reading and understanding the present specification, aspects described herein are directed towards prevention of malicious use of endpoint devices. A computing device may receive data indicative of usage of the computing device by a user. The computing device may compare the received data with other data stored on the computing device to identify instances of abnormal usage of the computing device, where the other data is indicative of how an authorized user for that computing device uses the computing device. The computing device may detect unauthorized use of the computing device based on the number of instances of abnormal usage exceeding a threshold. The computing device may prevent access to a computing environment with use of the computing device in response to detection of unauthorized use.

In one or more instances, the computing device may receive the other data, which may correspond to one or more metrics including one or more of: location data or information indicating interactions of the authorized user with an application on the computing device. In one or more instances, the one or more metrics may be selected based on a job title of the authorized user of the computing device.

In one or more instances, the computing device may train, using the other data stored on the computing device, a machine learning model, which may configure the machine learning model to distinguish use of the computing device by the authorized user of the computing device from use of the computing device by an unauthorized user of the computing device. In one or more instances, the computing device may train the machine learning model by computing, for each of the one or more metrics, a weight value indicating how relevant the corresponding metrics are to identifying unauthorized access to the computing device.

In one or more instances, the computing device may compute the weight values by: 1) computing, for a first metric of the one or more metrics and based on a first average deviation value of the initial data corresponding to the first metric, a first weight value; and 2) computing, for a second metric of the one or more metrics and based on a second average deviation value of the initial data corresponding to the second metric, a second weight value, where the first average deviation value is lower than the second average deviation value, and the first weight value is larger than the second weight value.

In one or more instances, the computing device may compare the weight values to a predetermined metric selection threshold. The computing device may determine that a subset of the weight values do not exceed the predetermined metric selection threshold. The computing device may remove, from the machine learning model, initial data corresponding to metrics affiliated with the subset of the weight values.

In one or more instances, the computing device may train the machine learning model by establishing, based on the other data and for the one or more metrics, one or more metric thresholds that separate other data corresponding to each of the one or more metrics into subgroups for the corresponding one or more metrics, where comparing the received data to the other data includes: 1) filtering the received data based on the one or more metric thresholds; and 2) comparing the received data for each of the one or more metric thresholds with the other data for the corresponding metric thresholds of the one or more metric thresholds.

In one or more instances, the computing device may detect the unauthorized use of the computing device by: 1) computing, based on the comparison of the received data to the other data, a weighted security score, wherein computing the weighted security score comprises: a) identifying, for each metric and based on a difference between the received data and the other data, whether the received data for the corresponding metric indicates unauthorized use of the computing device, b) computing, for metrics indicating possible unauthorized use of the computing device, a first set of weighted metric scores using the formula: weighted metric score=$-1 \times$corresponding weighted value, c) computing, for metrics indicating authorized use of the computing device, a second set of weighted metric scores equal to the corresponding weighted values, and d) computing, by adding the first set of weighted metric scores and the second set of weighted metric scores, a weighted security score; and 2) in response to determining that the weighted security score is a negative value, determining that the computing device is being used in an unauthorized manner.

In one or more instances, the computing device may prevent access to the computing environment with the use of the computing device by one or more of: deleting data from the computing device, disabling an authentication token, or prompting for re-authentication. In one or more instances, the computing device may prevent access to the computing environment in response to determining that connection between the computing device and an enterprise server is unavailable for communication.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
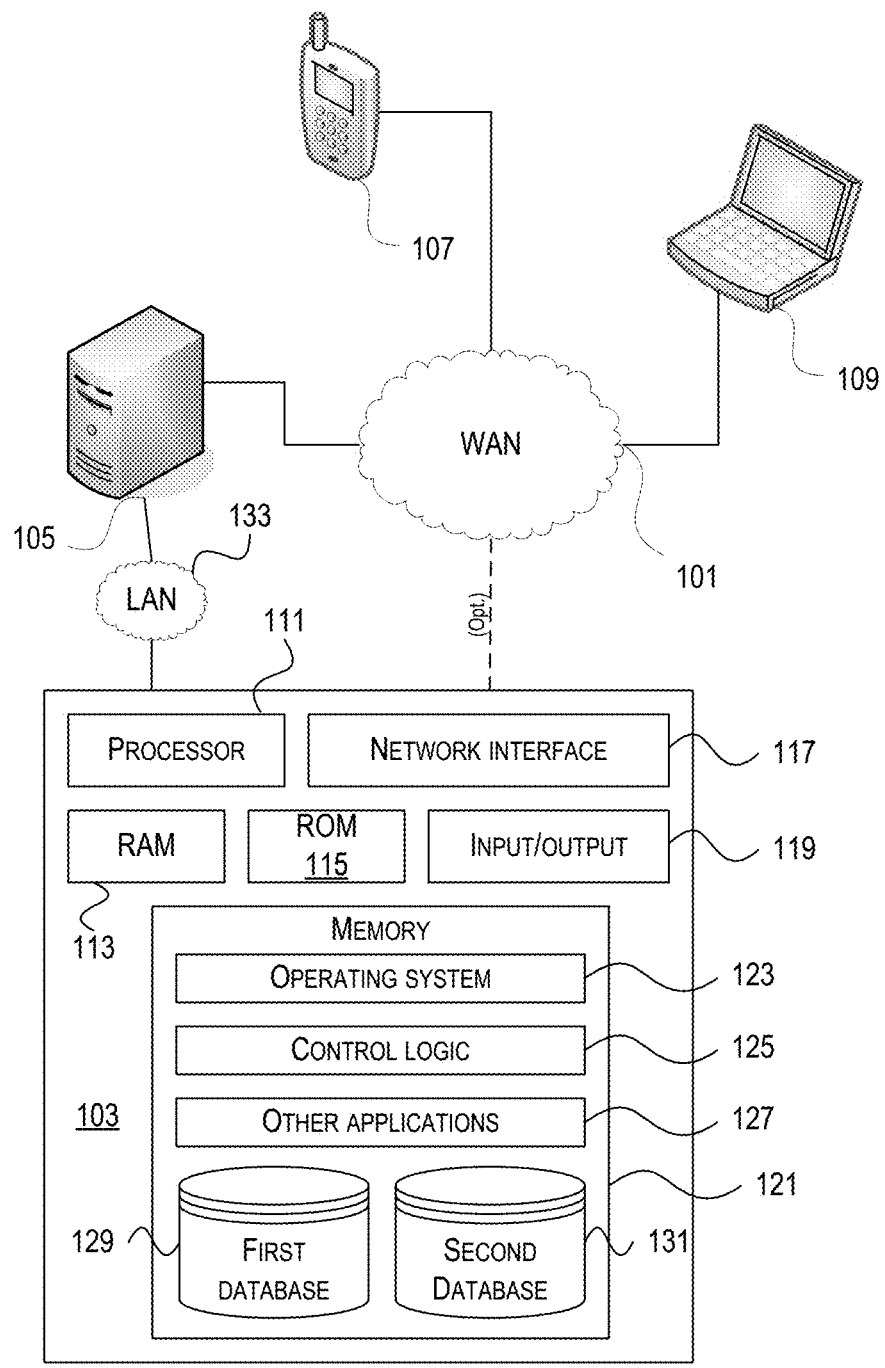
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using machine learning to protect enterprise data from unauthorized access. For example, endpoint computing devices of the enterprise may be managed using a third party product (e.g., mobile device management may be implemented with the use of a third party product that has management features for particular vendors). In some instances, a malicious or unauthorized user may gain possession of these devices, and may cause harm to an enterprise by sending out phishing emails, accessing sensitive corporate data, causing disruption to business services, or otherwise using the lost or stolen device in an unauthorized manner.

The existing solution to this security problem involves a valid or otherwise authorized user reporting his or her device as lost or stolen to the enterprise, at which point an administrator may lock the device, wipe corporate data from the device, fully wipe the device, invalidate an access token, refresh an access token, lock a user account, require a password update, and/or perform other security actions. Nevertheless, a malicious user may still cause harm to the enterprise in the window of time between the device being lost or stolen and the administrator performing the security actions. In some instances, the user may be unaware of the device being lost or unable to contact the enterprise for a prolonged period (e.g., the user has no or limited means of communication), in which case the time window may be substantial.

Accordingly, one or more of the systems and methods described herein may be implemented to mitigate harm to such enterprises that may occur in the window of time between when the malicious or unauthorized user gets the device and when the device is remotely blocked by the administrator. For example, as described below, an artificial intelligence (AI) agent may be deployed on the device that may identify suspicious behavior by learning normal usage behavior over time. Using the learned behavior of the user, the agent can now limit or otherwise eliminate the period between loss of an asset and a user's reporting of that loss. To this end, the agent may automatically perform security actions similar to those described above with regard to the administrator upon recognition that the device has been lost. This may result in improved enterprise data security by reducing or otherwise eliminating the risk of malicious actors using a lost asset to access data of the enterprise.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid-state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Enterprise Mobility Management Architecture

Figure 2:
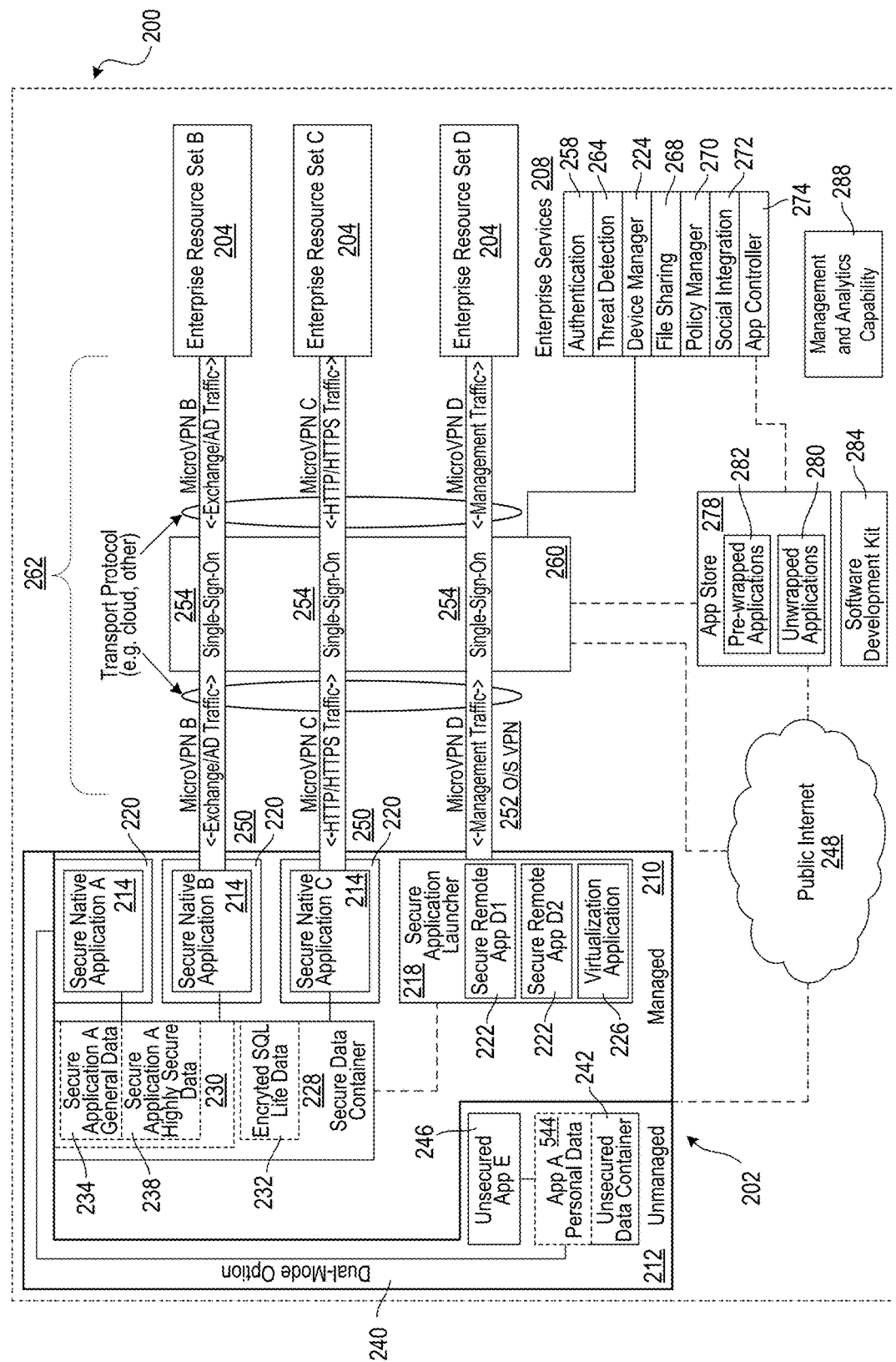
FIG. 2 depicts an illustrative enterprise mobility management system.

FIG. 2 represents an enterprise mobility technical architecture 200 for use in a "Bring Your Own Device" (BYOD) environment. The architecture enables a user of a mobile device 202 (which may e.g., be similar to enterprise user device 402) to both access enterprise or personal resources from a mobile device 202 and use the mobile device 202 for personal use. The user may access such enterprise resources 204 or enterprise services 208 using a mobile device 202 that is purchased by the user or a mobile device 202 that is provided by the enterprise to the user. The user may utilize the mobile device 202 for business use only or for business and personal use. The mobile device 202 may run an iOS operating system, an Android operating system, or the like. The enterprise may choose to implement policies to manage the mobile device 202. The policies may be implemented through a firewall or gateway in such a way that the mobile device 202 may be identified, secured or security verified, and provided selective or full access to the enterprise resources (e.g., 204 and 208.) The policies may be mobile device management policies, mobile application management policies, mobile data management policies, or some combination of mobile device, application, and data management policies. A mobile device 202 that is managed through the application of mobile device management policies may be referred to as an enrolled device.

In some embodiments, the operating system of the mobile device 202 may be separated into a managed partition 210 and an unmanaged partition 212. The managed partition 210 may have policies applied to it to secure the applications running on and data stored in the managed partition 210. The applications running on the managed partition 210 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 202. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted such that they can only communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 214, secure remote applications 222 executed by a secure application launcher 218, virtualization applications 226 executed by a secure application launcher 218, and the like. The secure native applications 214 may be wrapped by a secure application wrapper 220. The secure application wrapper 220 may include integrated policies that are executed on the mobile device 202 when the secure native application 214 is executed on the mobile device 202. The secure application wrapper 220 may include meta-data that points the secure native application 214 running on the mobile device 202 to the resources hosted at the enterprise (e.g., 204 and 208) that the secure native application 214 may require to complete the task requested upon execution of the secure native application 214. The secure remote applications 222 executed by a secure application launcher 218 may be executed within the secure application launcher 218. The virtualization applications 226 executed by a secure application launcher 218 may utilize resources on the mobile device 202, at the enterprise resources 204, and the like. The resources used on the mobile device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 226 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 202, this arrangement may also be elected for certain applications. For example, while some applications may be secured for use on the mobile device 202, others might not be prepared or appropriate for deployment on the mobile device 202 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 202 so the enterprise may elect to provide access to the application through virtualization techniques. As yet another example, the enterprise may have an application that maintains highly secured data (e.g., human resources data, customer data, engineering data, etc.) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 202 as well as a virtualization application 226 to allow access to applications that are deemed more properly operated on the server side. In an embodiment, the virtualization application 226 may store some data, files, etc. on the mobile device 202 in one of the secure storage locations. An enterprise, for example, may elect to allow certain information to be stored on the mobile device 202 while not permitting other information.

In connection with the virtualization application 226, as described herein, the mobile device 202 may have a virtualization application 226 that is designed to present GUIs and then record user interactions with the GUI. The virtualization application 226 may communicate the user interactions to the server side to be used by the server side application as user interactions with the application. In response, the application on the server side may transmit back to the mobile device 202 a new GUI. For example, the new GUI may be a static page, a dynamic page, an animation, or the like, thereby providing access to remotely located resources.

The secure applications 214 may access data stored in a secure data container 228 in the managed partition 210 of the mobile device 202. The data secured in the secure data container may be accessed by the secure native applications 214, secure remote applications 222 executed by a secure application launcher 218, virtualization applications 226 executed by a secure application launcher 218, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the mobile device 202 upon receipt of a command from the device manager 224. The secure applications (e.g., 214, 222, and 226) may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the mobile device 202. The data stored in an unsecured data container may be personal data 244. The data stored in an unsecured data container 242 may also be accessed by unsecured applications 246 that are running on the unmanaged partition 212 of the mobile device 202. The data stored in an unsecured data container 242 may remain on the mobile device 202 when the data stored in the secure data container 228 is deleted from the mobile device 202. An enterprise may want to delete from the mobile device 202 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 202 may connect to enterprise resources 204 and enterprise services 208 at an enterprise, to the public Internet 248, and the like. The mobile device 202 may connect to enterprise resources 204 and enterprise services 208 through virtual private network connections. The virtual private network connections, also referred to as microVPN or application-specific VPN, may be specific to particular applications (as illustrated by microVPNs 250, particular devices, particular secured areas on the mobile device (as illustrated by O/S VPN 252), and the like. For example, each of the wrapped applications in the secured area of the mobile device 202 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the mobile device 202. The access gateway 260 may also re-route traffic from the mobile device 202 to the public Internet 248, enabling the mobile device 202 to access publicly available and unsecured applications that run on the public Internet 248. The mobile device 202 may connect to the access gateway via a transport network 262. The transport network 262 may use one or more transport protocols and may be a wired network, wireless network, cloud network, local area network, metropolitan area network, wide area network, public network, private network, and the like.

The enterprise resources 204 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud-based resources, and the like. The enterprise resources 204 may be accessed by the mobile device 202 directly or through the access gateway 260. The enterprise resources 204 may be accessed by the mobile device 202 via the transport network 262.

The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services, and the like. Authentication services 258 may use certificates. The certificates may be stored on the mobile device 202, by the enterprise resources 204, and the like. The certificates stored on the mobile device 202 may be stored in an encrypted location on the mobile device 202, the certificate may be temporarily stored on the mobile device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the mobile device 202 through the access gateway 260, through the public Internet 248, or the like. The application store 278 may be provided with an intuitive and easy to use user interface.

A software development kit 284 may provide a user the capability to secure applications selected by the user by wrapping the application as described previously in this description. An application that has been wrapped using the software development kit 284 may then be made available to the mobile device 202 by populating it in the application store 278 using the application controller 274.

The enterprise mobility technical architecture 200 may include a management and analytics capability 288. The management and analytics capability 288 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
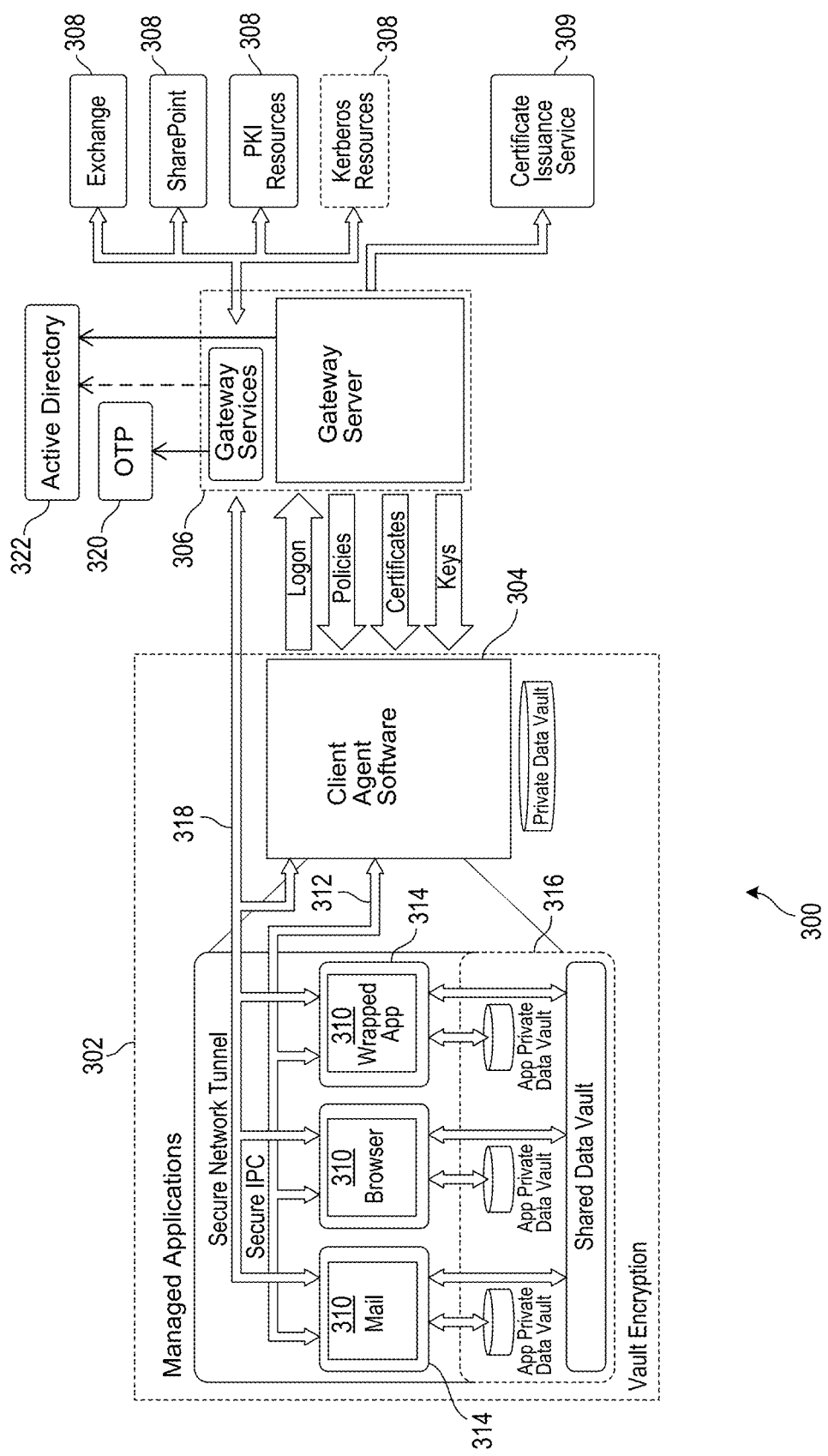
FIG. 3 depicts another illustrative enterprise mobility management system.

FIG. 3 is another illustrative enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled mobile device 302 (which may, e.g., be similar to enterprise user device 402) with a client agent 304, which interacts with gateway server 306 (which includes Access Gateway and application controller functionality) to access various enterprise resources 308 and services 309 such as Exchange, SharePoint, public-key infrastructure (PKI) Resources, Kerberos Resources, Certificate Issuance service, as shown on the right hand side above. Although not specifically shown, the mobile device 302 may also interact with an enterprise application store (StoreFront) for the selection and downloading of applications.

The client agent 304 acts as the UI (user interface) intermediary for Windows apps/desktops hosted in an Enterprise data center, which are accessed using the High-Definition User Experience (HDX)/ICA display remoting protocol. The client agent 304 also supports the installation and management of native applications on the mobile device 302, such as native iOS or Android applications. For example, the managed applications 310 (mail, browser, wrapped application) shown in the figure above are all native applications that execute locally on the mobile device 302. Client agent 304 and application management framework of this architecture act to provide policy driven management capabilities and features such as connectivity and SSO (single sign on) to enterprise resources/services 308.

The client agent 304 handles primary user authentication to the enterprise, normally to Access Gateway (AG) 306 with SSO to other gateway server components. The client agent 304 obtains policies from gateway server 306 to control the behavior of the managed applications 310 on the mobile device 302.

The Secure inter-process communication (IPC) links 312 between the native applications 310 and client agent 304 represent a management channel, which may allow a client agent to supply policies to be enforced by the application management framework 314 "wrapping" each application. The IPC channel 312 may also allow client agent 304 to supply credential and authentication information that enables connectivity and SSO to enterprise resources 308. Finally, the IPC channel 312 may allow the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 may request policy information from client agent 304, which in turn may request it from gateway server 306. The application management framework 314 may request authentication, and client agent 304 may log into the gateway services part of gateway server 306 (for example, Citrix Gateway). Client agent 304 may also call supporting services on gateway server 306, which may produce input material to derive encryption keys for the local data vaults 316, or may provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel 312 and obtain the policy for that application. The application management framework 314 may enforce relevant portions of the policy that apply locally, such as the client agent login dependencies and some of the containment policies that restrict how local OS services may be used, or how they may interact with the managed application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through Access Gateway 306. The application management framework 314 may be responsible for orchestrating the network access on behalf of each managed application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 have special status and may make use of facilities that might not be generally available to arbitrary wrapped applications. For example, the Mail application 310 may use a special background network access mechanism that allows it to access an Exchange server 308 over an extended period without requiring a full AG logon. The Browser application 310 may use multiple private data vaults 316 to segregate different kinds of data.

This architecture may support the incorporation of various other security features. For example, gateway server 306 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 316 (containers) on the mobile device 302. The vaults 316 may be encrypted so that all on-device data including files, databases, and configurations are protected. For on-line vaults, the keys may be stored on the server (gateway server 306), and for off-line vaults, a local copy of the keys may be protected by a user password or biometric validation. If or when data is stored locally on the mobile device 302 in the secure container 316, it may be preferred that a minimum of AES 256 encryption algorithm be utilized.

Other secure container features may also be implemented. For example, a logging feature may be included, wherein security events happening inside a managed application 310 may be logged and reported to the backend. Data wiping may be supported, such as if or when the managed application 310 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 302 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it is needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 314 may be prevented in other ways. For example, if or when a managed application 310 is put in the background, the memory may be cleared after a predetermined (configurable) time. When backgrounded, a snapshot may be taken of the last displayed screen of the application to fasten the foregrounding process. The screenshot may contain confidential data and hence should be cleared.

Another security feature may relate to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text may be sent to the user with an OTP 320. In some cases, this may be implemented only for online use, with a prompt being a single field.

An offline password may be implemented for offline authentication for those managed applications 310 for which offline use is permitted via enterprise policy. For example, an enterprise may want StoreFront to be accessed in this manner In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 310 as secondary credentials (for the purpose of accessing PKI protected web resources via the application management framework microVPN feature). For example, a managed application 310 may utilize such a certificate. In this case, certificate-based authentication using ActiveSync protocol may be supported, wherein a certificate from the client agent 304 may be retrieved by gateway server 306 and used in a keychain. Each managed application 310 may have one associated client certificate, identified by a label that is defined in gateway server 306.

Gateway server 306 may interact with an enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications 310, and ultimately by arbitrary wrapped applications 310 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 310 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 302 be authenticated to the enterprise, and vice versa. Virtual smart cards for authentication to gateway server 306 may also be implemented.

Another feature may relate to application container locking and wiping, which may automatically occur upon jailbreak or rooting detections, and occur as a pushed command from administration console, and may include a remote wipe functionality even when a managed application 310 is not running.

A multi-site architecture or configuration of enterprise application store and an application controller may be supported that allows users to be serviced from one of several different locations in case of failure.

In some cases, managed applications 310 may be allowed to access a certificate and private key via an API (for example, OpenSSL). Trusted managed applications 310 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Prevention of Malicious Use of Endpoint Devices

Figure 4A:
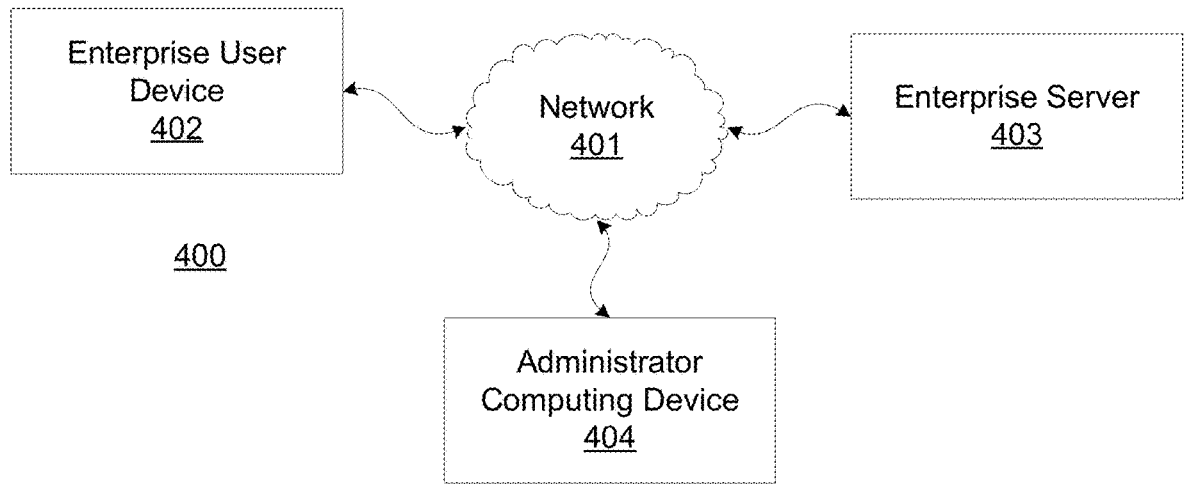
FIGS. 4A and 4B depict an illustrative computing environment to prevent malicious use of endpoint devices in accordance with one or more illustrative aspects described herein.
Figure 4B:
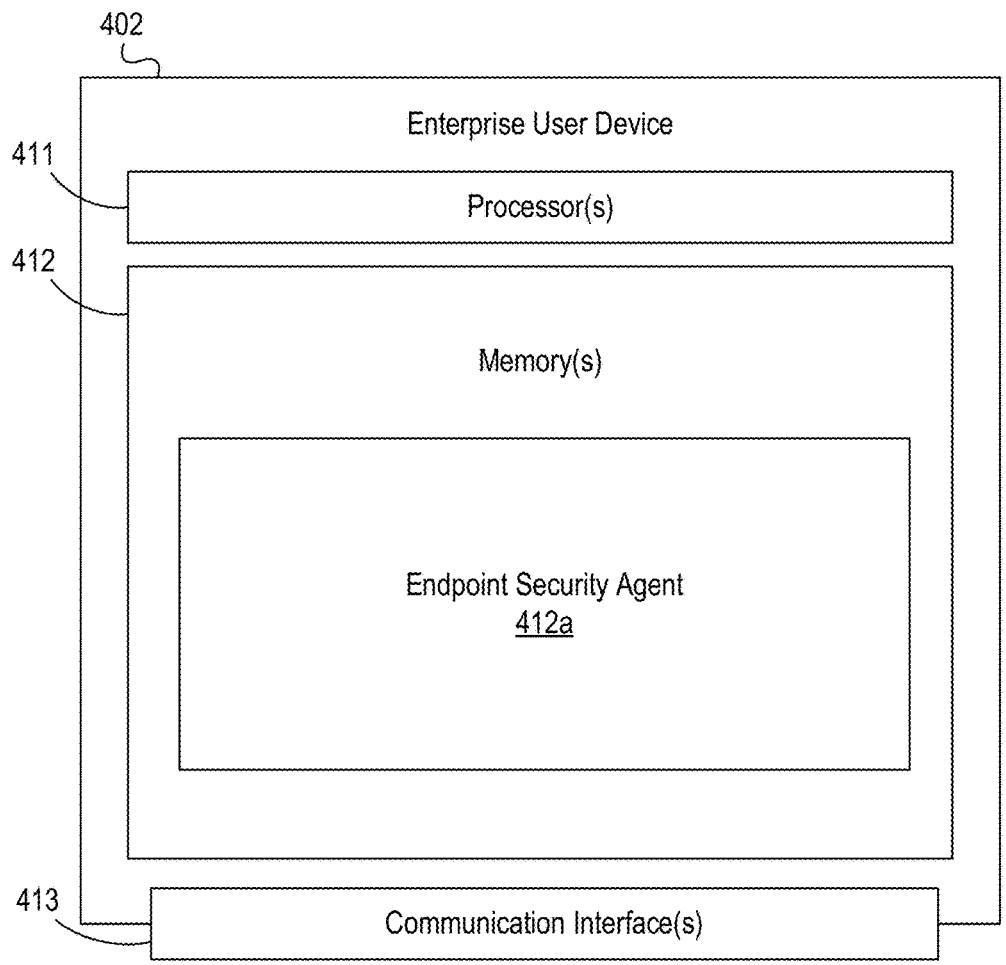

FIGS. 4A and 4B depict an illustrative computing environment for preventing malicious use of endpoint devices in accordance with one or more illustrative aspects described herein. Referring to FIG. 4A, computing environment 400 may include one or more computer systems. For example, computing environment 400 may include an enterprise user device 402, an enterprise server 403, and an administrator computing device 404.

As illustrated in detail below, enterprise user device 402 may be a personal computing device such as a smartphone, tablet, laptop computer, desktop computer, or the like. In some instances, enterprise user device 402 may be configured for management by a third party organization (e.g., using mobile device management), and may in some instances store enterprise data that is confidential or otherwise protected. In some instances, enterprise user device 402 may be further configured to host an endpoint security agent that may be used to identify unauthorized use of the enterprise user device 402 and perform one or more security actions accordingly.

Enterprise server 403 may be a computer system that includes one or more computing devices (e.g., servers, server blades, or the like) and/or other computer components (e.g., processors, memories, communication interfaces). In one or more instances, enterprise server 403 may be configured to store enterprise data and/or security policies that may be used to manage enterprise user devices (e.g., enterprise user device 402, or the like). In some instances, the enterprise server 403 may communicate with the administrator computing device 404 to generate the endpoint security agent, and may be configured to deploy the endpoint security agent 412a to the enterprise user device 402.

In one or more instances, administrator computing device 404 may be or include one or more computing devices (e.g., servers, server blades, or the like) configured to receive user input (e.g., from an administrative user employed by the enterprise organization) defining one or more policies for the endpoint security agent 412a. In these instances, the administrator computing device 404 may send policy information, based on the user input, to the enterprise server 403, which may enable the enterprise server 403 to generate the endpoint security agent.

Computing environment 400 may also include one or more networks, which may interconnect enterprise user device 402, enterprise server 403, and administrator computing device 404. For example, computing environment 400 may include a wired or wireless network 401 (which may e.g., interconnect enterprise user device 402, enterprise server 403, and administrator computing device 404).

In one or more arrangements, enterprise user device 402, enterprise server 403, administrator computing device 404, and/or the other systems included in computing environment 400 may be any type of computing device capable of receiving a user interface, receiving input via the user interface, and communicating the received input to one or more other computing devices. For example, enterprise user device 402, enterprise server 403, administrator computing device 404, and/or the other systems included in computing environment 400 may in some instances, be and/or include server computers, desktop computers, laptop computers, tablet computers, smart phones, or the like that may include one or more processors, memories, communication interfaces, storage devices, and/or other components. As noted above, and as illustrated in detail below, any and/or all of enterprise user device 402, enterprise server 403, and administrator computing device 404 may, in some instances, be special purpose computing devices configured to perform specific functions.

Referring to FIG. 4B, enterprise user device 402 may include one or more processors 411, memory 412, and communication interface 413. A data bus may interconnect processor 411, memory 412, and communication interface 413. Communication interface 413 may be a network interface configured to support communication between the enterprise user device 402 and one or more networks (e.g., network 401, or the like). Memory 412 may include one or more program modules having instructions that when executed by processor 411 cause enterprise user device 402 to perform one or more functions described herein and/or access one or more databases that may store and/or otherwise maintain information which may be used by such program modules and/or processor 411. In some instances, the one or more program modules and/or databases may be stored by and/or maintained in different memory units of enterprise user device 402 and/or by different computing devices that may form and/or otherwise make up enterprise user device 402. For example, memory 412 may have, host, store, and/or include instructions that direct and/or otherwise cause the enterprise user device 402 to apply one or more machine learning techniques to distinguish between authorized and unauthorized use of the enterprise user device 402 and to perform one or more security actions accordingly. For example, the memory 412 may store an endpoint security agent 412*a*, which may be configured to assess use of the enterprise user device 402 based on one or more enterprise policies. In this example, the endpoint security agent 412*a* may be a model (e.g., a machine learning model, artificial intelligence model, or the like) configured for deployment to the enterprise user device 402, that may learn normal usage behavior over time, and use this learned normal usage behavior to identify suspicious behavior at the enterprise user device 402. In some instances, this endpoint security agent 412*a* may be configured to take action in response to identifying suspicious behavior (e.g., similar to an administrator performing a security action on a lost device). In some instances, the enterprise user device 402 may be enrolled in a mobile device management (MDM) solution. In other instances, the enterprise user device 402 might not be enrolled in a MDM solution or offer MDM support.

Figure 5A:
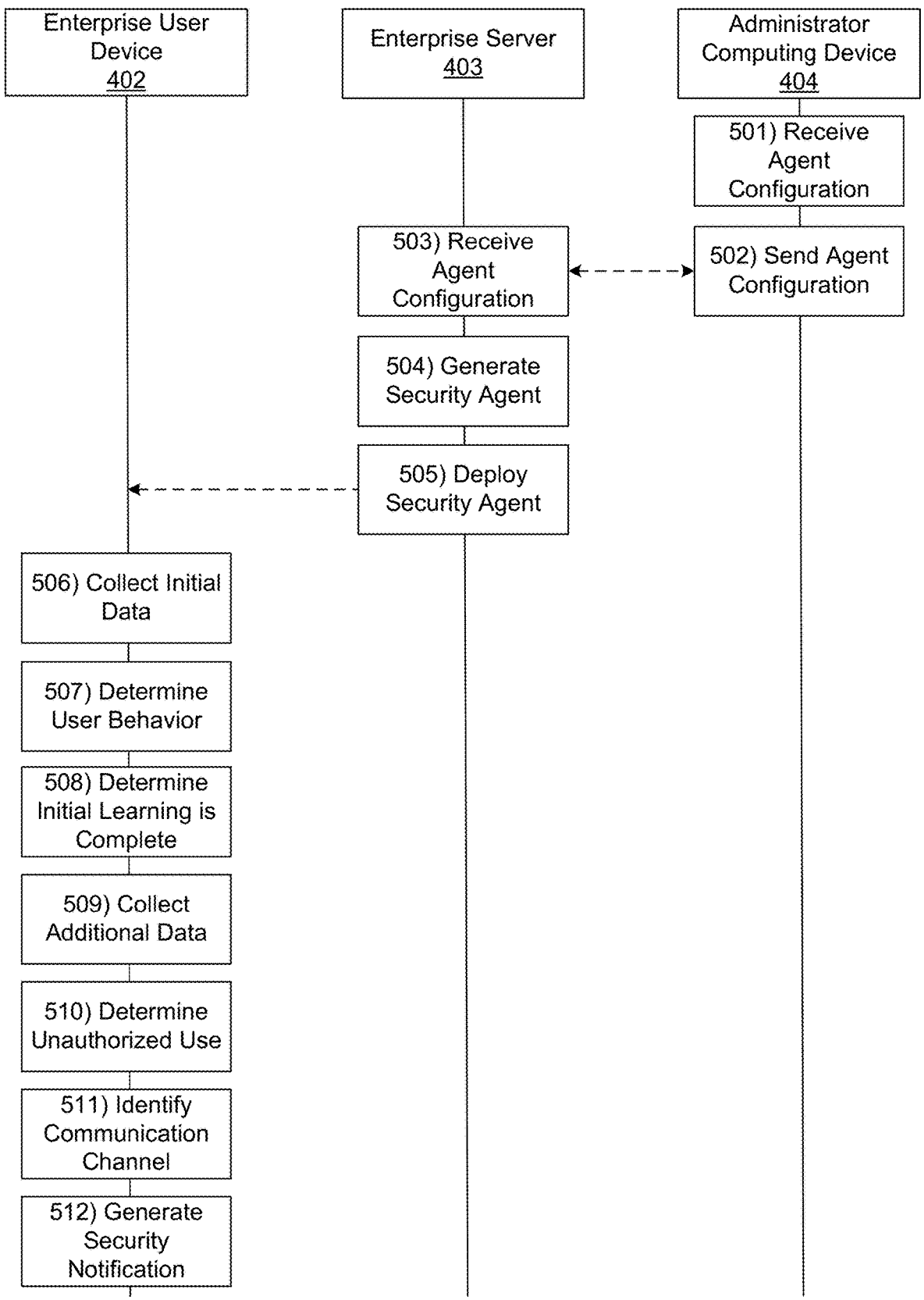
FIGS. 5A and 5B depict an illustrative event sequence to prevent malicious use of endpoint devices in accordance with one or more illustrative aspects described herein in accordance with one or more illustrative aspects described herein.
Figure 5B:
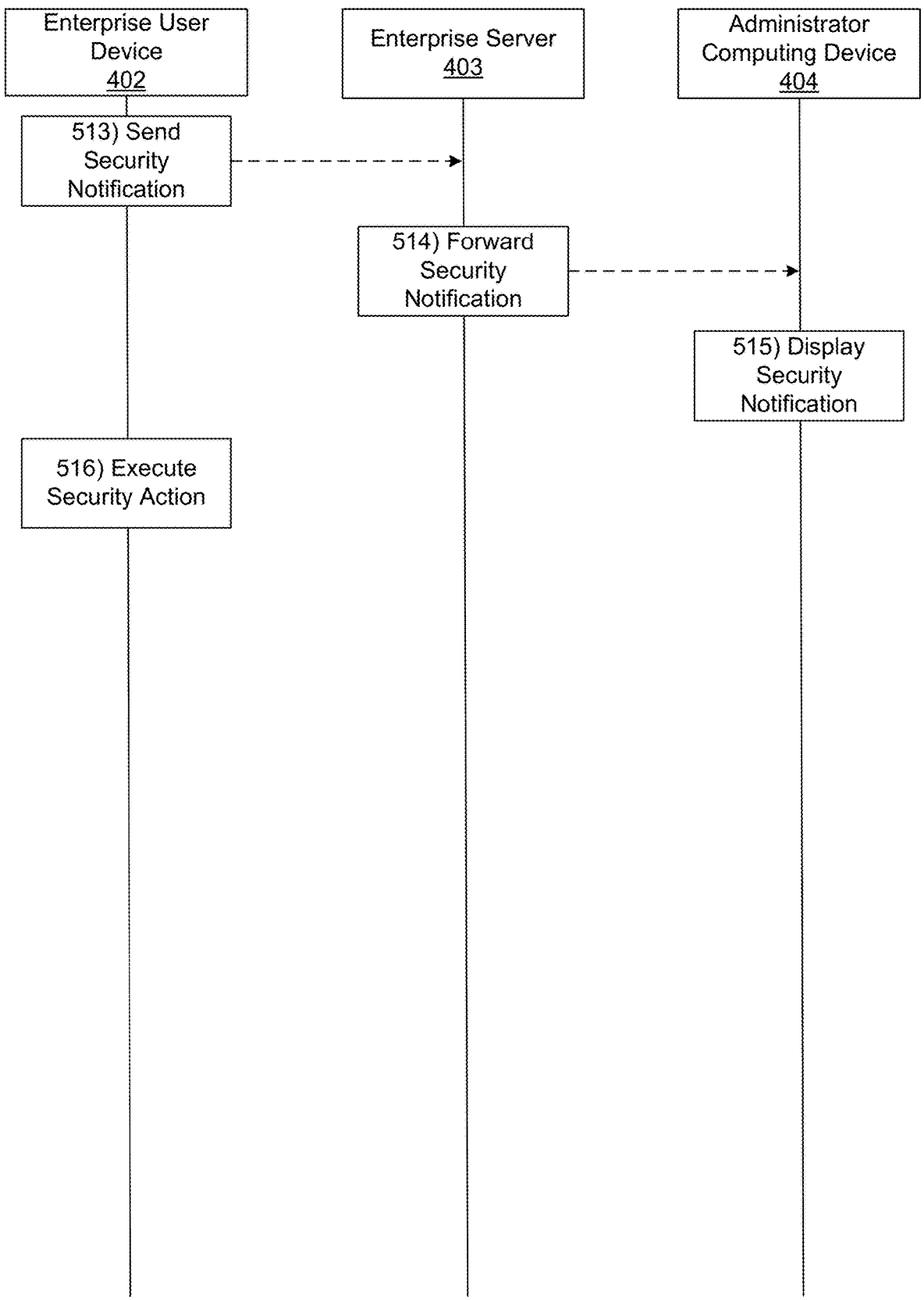

FIGS. 5A and 5B depict an illustrative event sequence for preventing malicious use of endpoint devices in accordance with one or more illustrative aspects described herein. For convenience, steps 501-516 are shown across FIGS. 5A and 5B. However, it should be understood that steps 501-516 represent a single event sequence (e.g., step 513 in FIG. 5B may follow step 512 in FIG. 5A).

Referring to FIG. 5A, at step 501, the administrator computing device 404 may receive an agent configuration input. For example, the administrator computing device 404 may receive user input from an individual (e.g., an administrative user employed by an enterprise organization) defining one or more metrics that should be monitored by the endpoint security agent.

For example, in receiving the agent configuration input, the administrator computing device 404 may receive a selection of one or more of the following metrics: amount of time spent using a managed desktop, number of files downloaded/accessed, number of times an application is opened, time duration for each application session, number of emails read, number of emails sent, number of email searches, size of sent emails, number of emails sent to external email addresses, number of emails deleted (from inbox or sent mail), blacklist sites visited, data volume usage by each application, delete history of a browser application, number of filed downloaded, number of filed accessed, number of files shared, stored file types, stored file sizes, global positioning system (GPS) data, frequently visited locations (e.g., home, work, or other locations), a convex hull of all frequently visited locations, a number of failed login attempts, a number of documents printed, a number of pages printed, and/or other usage data corresponding to the enterprise user device 402. In some instances, these metrics may be stored on an application-by-application basis in metric selection templates defined by third party application developers (e.g., enterprise mobility applications, mail applications, web browsing applications, file storage/sharing applications, or other applications). In these instances, in receiving the agent configuration input, the administrator computing device 404 may receive user input at one or more of these metric selection templates. In some instances, the metrics may be auto-selected based on a role, job title, or other characteristics of a user of the enterprise user device 402 (e.g., a first predetermined set of metrics for all engineers, a second predetermined set of metrics for all marketing personnel, or the like).

In some instances, in receiving the agent configuration input, the administrator computing device 404 may receive an input defining an initial learning period for a machine learning model included in the endpoint security agent 412*a*. For example, the administrator computing device 404 may receive an input defining a period of time (e.g., thirty days, or another predetermined period) during which the enterprise user device 402 may collect usage data for the enterprise user device before analyzing whether the enterprise user device 402 is experiencing authorized or unauthorized use.

At step 502, the administrator computing device 404 may send agent configuration information to the enterprise server 403. For example, the administrator computing device 404 may send information, based on the agent configuration input received at step 501, to the enterprise server 403. At step 503, the enterprise server 403 may receive the agent configuration information sent at step 502.

At step 504, the enterprise server 403 may generate the endpoint security agent 412*a*. For example, the enterprise server 403 may assemble the agent configuration information into a machine learning model that may be deployed to the enterprise user device 402 and trained for analysis and identification of authorized and/or unauthorized use of the enterprise user device 402 (e.g., to distinguish between authorized and unauthorized use).

At step 505, the enterprise server 403 may deploy the endpoint security agent 412*a* to the enterprise user device 402. For example, the enterprise server 403 may send the machine learning model to the enterprise user device 402, along with an indication of the initial training period. In some instances, the enterprise server 403 may further generate one or more commands directing the enterprise user device 402 to train the machine learning model for the initial training period. In these instances, the enterprise server 403 may send the one or more commands directing the enterprise user device 403 to train the machine learning model for the initial training period to the enterprise user device 402.

At step 506, after the endpoint security agent 412*a* has been deployed, the enterprise user device 402 may collect usage data for the enterprise user device 402. For example, the enterprise user device 402 may collect initial data corresponding to the metrics described above at step 501. In some instances, the enterprise user device 402 may assume that this initial data corresponds to authorized use of the enterprise user device 402, and may be used to train the machine learning model to distinguish between authorized and unauthorized use of the enterprise user device 402.

In some instances, in addition to or as an alternative to having the metrics defined by an administrator as described in steps 501-505, the enterprise user device 402 may select and/or update (e.g., automatically select and/or update) the metrics using machine learning techniques. As an example, the enterprise user device 402 may identify that only an email application is used on the enterprise user device 402, and so may select only the metrics related to the email application. Additionally or alternatively, the enterprise user device 402 may select and/or update the metrics based on a role or job title of an authorized user of the enterprise user device 402. For example, a selection of metrics may be defined for employees of a particular job title, rank, or the like, and the enterprise user device 402 may select these metrics accordingly. In both of these examples, the enterprise user device 402 may then collect data corresponding to the metrics as described above. In some instances, the enterprise user device may dynamically modify the metrics over time. For example, the metrics may be initially defined (e.g., by an administrator, using machine learning, or other metrics selection methods), and may then be dynamically modified over time using machine learning based on updated usage of the enterprise user device 402. For example, although only metrics for the email application may have been initially selected, metrics for a browser application may be added based on a determination that usage of the browser application has increased since deployment of the endpoint security agent 412a.

At step 507, the enterprise user device 402 may determine user behavior (e.g., by training a machine learning model) based on the data (e.g., initial data) collected at step 505. For example, the enterprise user device 402 may separate the data on a metric-by-metric basis, define one or more thresholds for individual metrics, and further separate the data for individual metrics based on the one or more thresholds. For example, with regard to application usage of an email application, the enterprise user device 402 may generate thresholds of greater than five minutes, greater than ten minutes, greater than twenty minutes, greater than thirty minutes, or the like, and may distribute the data pertaining to application usage for the email application accordingly. For example, the enterprise user device 402 may determine, based on analysis of the data, that for a first day, the enterprise user device 402 used the email application for more than five minutes a single time and more than ten minutes a single time, but never more than twenty minutes. Similarly, the enterprise user device 402 may determine that, for a second day, the enterprise user device 402 used the email application for more than five minutes a single time, but never more than ten minutes. In some instances, the enterprise user device 402 may further label the data based on a time, a day of the week, holidays, and/or other time/calendar parameters. In doing so, the enterprise user device 402 may establish regular usage patterns of the enterprise user device 402 that correspond to authorized use of the enterprise user device 402 (e.g., regular usage patterns of an authorized user of the enterprise user device 402), which may in some instances, be different based on a day of the week (weekend vs. weekday), a time of day (working hours vs. outside of work hours), whether or not it is a holiday, or the like.

In one or more instances, determining user behavior may include computation of weight values for at least one metric threshold and/or metric corresponding to the enterprise user device 402. Such computations may be based, for example, on how consistent values are for the corresponding metric thresholds and/or metrics. For example, because the enterprise user device 402 may be able to more accurately distinguish outlier usage patterns from consistent data, these consistent values may be assigned higher weight values and less consistent values may be assigned lower weight values (e.g., it may be more difficult for the enterprise user device 402 to distinguish outlier usage patterns from data that is already inconsistent). As a particular example, if GPS data for the enterprise user device 402 indicates that the authorized user of the enterprise user device 402 travels to different states for work each week, it may be difficult to identify outlier GPS data, and such GPS data may be assigned a lower weight value for the enterprise user device 402 than for an individual who works at the same location everyday (e.g., varied GPS data may indicate that the enterprise user device 402 has been stolen or lost).

Similarly, the enterprise user device 402 may assign weight values to subsets of the data as distributed based on the metric thresholds (e.g., email application usage less than five minutes, or the like). For example, if the enterprise user device 402 identifies that the initial data corresponding to "application usage exceeds five minutes" is more consistent than the initial data corresponding to "application usage exceeds ten minutes," the enterprise user device 402 may compute a higher weighting value for the "application usage exceeds five minutes" subset than for the "application usage exceeds ten minutes" subset.

Accordingly, in assigning these weight values, the enterprise user device 402 may provide a numeric indication of how relevant individual metrics and/or metrics threshold windows are to identifying unauthorized access to the enterprise user device 402. In some instances, the enterprise user device 402 may compute an average deviation value of the data corresponding to a particular metric/metric threshold window, and may compute the corresponding weight value based on this average deviation value. In doing so, the enterprise user device 402 may compute a higher weight value the lower the average deviation value is and may compute a lower weight value the higher the average deviation value is (e.g., more consistent data results in a higher weight value).

In some instances, the enterprise user device 402 may compare these weight values to a metric selection threshold (e.g., a predetermined threshold). In these instances, the enterprise user device 402 may disregard metrics and/or subsets of the data corresponding to weight values less than the predetermined metric selection threshold. In doing so, the enterprise user device 402 may conserve computing resources by not factoring inconsistent data into the determination of patterns of authorized use.

In one or more instances, this receipt of data and determination of user behavior described at steps 506 and 507 may be continuous for a period of time (e.g., an initial or training period). Accordingly, the enterprise user device 402 may distinguish use of the computing device by the authorized user of the computing device from use of the computing device by an unauthorized user of the computing device based on the determined user behavior.

At step 508, the enterprise user device 402 may compare an elapsed period of time since deployment of the endpoint security agent 412a with a time threshold (e.g., has the endpoint security agent 412a been deployed at the enterprise user device 402 for more than 30 days, or some other predetermined time period). Once the enterprise user device 402 determines that the elapsed period of time equals the learning period, the enterprise user device 402 may transition from a learning mode (e.g., as described in steps 506 and 507) to an analysis and learning mode as described below. For example, the enterprise user device 402 may determine, by determining that the elapsed period of time equals the learning period, that enough data has been collected to establish patterns corresponding to authorized use of the enterprise user device 402 (e.g., that may be used to distinguish between patterns of unauthorized use and authorized use as described below).

At step 509, the enterprise user device 402 may collect additional data. For example, the enterprise user device 402 may use data collection techniques previously described at step 506. For example, the enterprise user device 402 may collect data corresponding to the metrics described at step 501. In some instances, however, the initial data collected at step 506 may be received from an authorized user of the enterprise user device 402, whereas the additional data collected at step 509 may be received from an authorized user or, in some instances, an unauthorized user.

At step 510, the enterprise user device 402 may feed or otherwise provide the additional data into the machine learning model, and may compare the additional data to data previously collected to distinguish between authorized and unauthorized use of the computing device. For example, the enterprise user device 402 may use the machine learning model or other data analytic techniques to determine if the usage behavior is unusual (e.g., due to use by an unauthorized user).

For example, the enterprise user device 402 may separate/filter the additional data on a metric-by-metric basis and, in some instances, further separate the additional data for individual metrics based on the one or more thresholds for individual metrics as described above at step 507 with regard to the initial data. For example, with regard to application usage for an email application, the enterprise user device 402 may distribute the additional data pertaining to application usage for the email application based on thresholds (e.g., greater than five minutes, greater than ten minutes, greater than twenty minutes, greater than thirty minutes, or other predetermined time periods) as described above. For example, the enterprise user device 402 may determine that the enterprise user device 402 used the email application once for between five and ten minutes. In this example, the enterprise user device 402 may determine that this is likely an authorized use because the data indicates that the normal usage patterns sometimes include single uses between five and ten minutes. In another example, the enterprise user device 402 may determine that the enterprise user device 402 used the email application three times for more than thirty minutes. In this example, the enterprise user device 402 may determine that this is likely an unauthorized use because the data indicates that the normal usage patterns never exceed twenty minutes. In some instances, the enterprise user device 402 may further compare timestamps, days of the week, holidays, and/or other time/calendar parameters for the additional and initial data. For example, if during normal usage the email application is never accessed on weekends, then data indicative of usage of thirty minutes on a Saturday may be flagged as unauthorized usage.

In performing the comparisons, the enterprise user device 402 may compare data for individual threshold windows for individual metrics. For example, with regard to the email application usage, the enterprise user device 402 may compare the time/day parameters as described above, as well as threshold windows (e.g., greater than five minutes, greater than ten minutes, greater than twenty minutes, greater than thirty minutes, or the like) to identify data that corresponds to similar circumstances (e.g., compare data for the workday to other workdays and data for weekends to other weekends, compare data collected between 9 AM-5 PM to other data with matching parameters and data collected outside of those hours to other data with matching parameters, or the like). In some instances, the enterprise user device 402 may generate a score for individual threshold windows indicating a degree of similarity between different portions of data. In some instances, the enterprise user device may compute a deviation between the normal usage values (which may, e.g., be an average value under similar time/data conditions as identifier over the initial learning period) and collected data. If this deviation exceeds a threshold, the enterprise user device 402 may flag or otherwise identify the data as an indication of potential unauthorized use and if the deviation does not exceed the threshold, the enterprise user device 402 may flag or otherwise identify the data as an indication of authorized use. For individual threshold windows, the enterprise user device 402 may apply a weight value as described above to compute a metric score (e.g., a total score corresponding to email application usage, or other metrics as identified above).

Once metric scores have been computed for individual metrics, the enterprise user device 402 may apply metric weight values as described above to compute a weighted security score. To do so, for individual metrics, the enterprise user device 402 may compare the corresponding metric score to a metric security threshold. If the enterprise user device 402 determines that the metric score does not exceed the metric security threshold, a negative metric weight value may be applied to the corresponding metric score (e.g., $-1\times$the weight value). For example, whatever weight value was identified for the given metric may be multiplied by negative one to result in a negative value. In doing so, when the negative metric weight value is applied to the corresponding metric score, the result may be a negative number. If the enterprise user device 402 determines that the metric score does exceed the metric security threshold, a positive metric weight value may be applied to the corresponding metric score. For example, whatever weight value was identified for the given metric may be applied (e.g., rather than multiplying the weight value by negative one as described with regard to the negative metric weight value. In doing so, when the positive metric weight value is applied to the corresponding metric score, the result may be a positive number. Once these positive and/or negative weighted metric scores have been computed, the enterprise user device 402 may compute a sum of the weighted metric scores to compute the weighted security score. If the enterprise user device 402 computes a weighted security score that is greater than 0 (or some other numeric threshold), the enterprise user device 402 may determine that the corresponding usage of the enterprise user device 402 is authorized. If the enterprise user device 402 computes a weighted security score that is less than 0 (or some other numeric threshold), the enterprise user device 402 may determine that the corresponding usage of the enterprise user device 402 is unauthorized.

If the enterprise user device 402 determines that the use is authorized, it may return to step 509. If the enterprise user device 402 determines that the use is unauthorized, it may proceed to step 511.

At step 511, the enterprise user device 402 may attempt to identify a communication channel with the enterprise server 403. For example, the enterprise user device 402 may determine whether or not it is able to communicate with the enterprise server 403 for purposes of sending a security notification to the enterprise server 403 indicating that the enterprise user device 402 is experiencing unauthorized use (e.g., if the enterprise user device 402 cannot communicate with the enterprise server 403 at a particular time, it may be unable to send the security notification). If the enterprise user device 402 is able to identify and/or establish a communication channel with the enterprise server 403, the enterprise user device 402 may proceed to step 512. If the enterprise user device is unable to identify and/or establish a communication channel with the enterprise server 403, the enterprise user device 402 may proceed to step 516. At step 512, the enterprise user device 402 may generate a security notification (e.g., a message or other indication) indicating that the enterprise user device 402 is experiencing unauthorized use.

Referring to FIG. 5B, at step 513, the enterprise user device 402 may send the security notification to the enterprise server 403. At step 514, the enterprise server 403 may forward the security notification, sent by the enterprise user device 402 at step 513, to the administrator computing device 404. In some instances, along with the security notification, the enterprise server 403 may send one or more commands directing the administrator computing device 404 to display the security notification.

Figure 7:
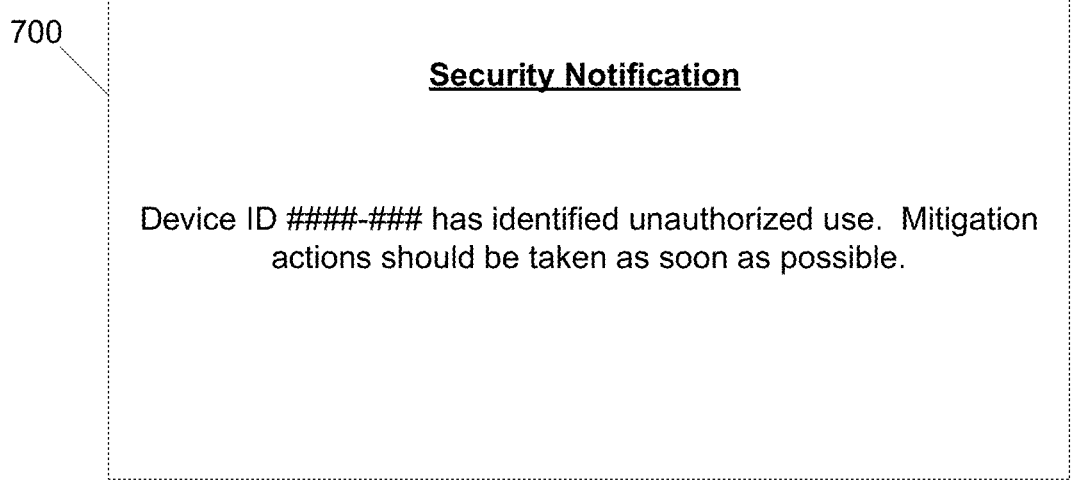
FIG. 7 depicts an illustrative notification useful in prevention of malicious use of endpoint devices in accordance with one or more illustrative aspects described herein.

At step 515, the administrator computing device 404 may display the security notification sent at step 514. In some instances, the administrator computing device 404 may display the security notification based on or in response to the one or more commands directing the administrator computing device 404 to display the security notification. In some instances, in displaying the security notification, the administrator computing device 404 may display a graphical user interface similar to graphical user interface 700, which is shown in FIG. 7, prompting an administrator to perform one or more mitigating measures. In some instances, the administrator computing device 404 may send a message to an authorized user of the enterprise user device 402 to confirm whether or not the identified usage was unauthorized (e.g., to confirm that the unusual usage pattern was not in fact authorized usage). In some instances, the administrator computing device 404 may send one or more commands to temporarily lock the enterprise user device 402.

At step 516, the enterprise user device 402 may execute a security action to remove the ability to access data in an unauthorized manner (e.g., disable access to the computing device). In some instances, the enterprise user device 402 may automatically execute the security action after determining that a connection with the enterprise server 403 cannot be established. For example, in some instances where the enterprise user device 402 is able to communicate with the enterprise server 403 to send the security notification, an administrative user may be notified immediately of the unauthorized use, and may be able to initiate the security action. In instances where a connection cannot be established with the enterprise server 403, the administrative user may not be informed of the unauthorized use, and thus the enterprise user device 402 may automatically execute a security action without additional commands from the enterprise server 403 or the administrator computing device 404 to optimize security of any enterprise or other data accessible with the enterprise user device 402 and/or to otherwise prevent unauthorized use of the enterprise user device 402. The enterprise user device 402 may execute the security action based on or in response to the determination that the enterprise user device 402 is being used by an unauthorized user. In other instances, the enterprise user device 402 may execute the security action after receiving commands from the administrator computing device 404 to do so (e.g., based on input from an administrative user at the administrator computing device 404). The enterprise user device 402 may execute the security action based on or in response to determining that a connection between the enterprise user device 402 and the enterprise server 403 is unavailable for communication (e.g., at step 511) and the identification of unauthorized use (e.g., at step 510).

For example, in executing the security action, the enterprise user device 402 may delete stored data, disable an authentication token, prompt for re-authentication, disable itself, and/or otherwise remove an ability to access data without authorization at the enterprise user device 402. In some instances, this security action may be initiated by the endpoint security agent 412a (e.g., rather than being initiated by an administrator through the administrator computing device 404).

Throughout the usage analysis and mitigating actions described at steps 509-516, machine learning models or other data analysis techniques may continually and dynamically be used and updated to improve the ability of the system to distinguish between authorized and unauthorized use of the enterprise user device 402.

Figure 6:
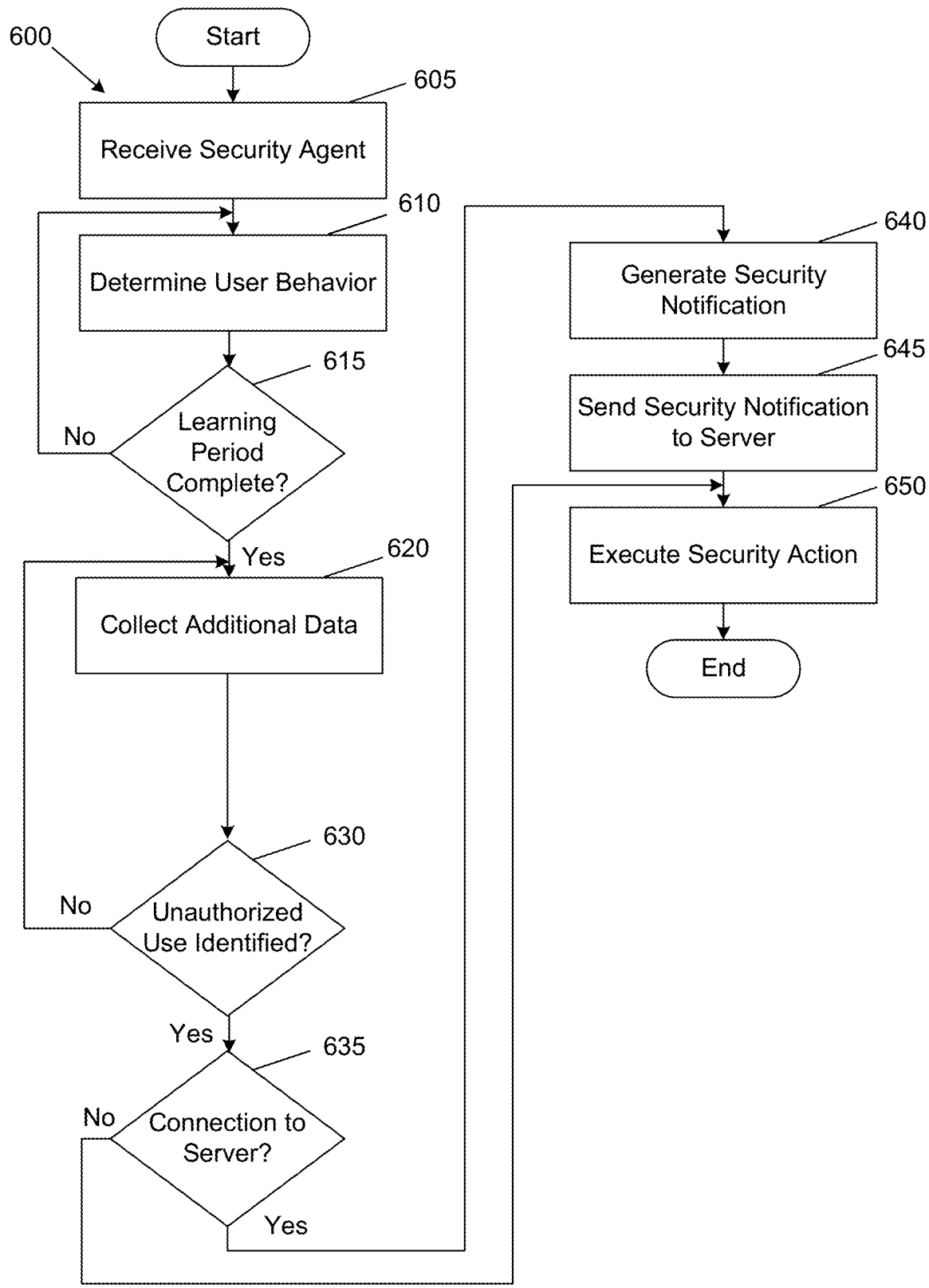
FIG. 6 depicts an illustrative method for to prevent malicious use of endpoint devices in accordance with one or more illustrative aspects described herein.

FIG. 6 depicts an illustrative method 600 for preventing malicious use of endpoint devices using machine learning in accordance with one or more illustrative aspects described herein. At step 605, a computing device comprising one or more processors, a communication interface, and memory may receive an endpoint security agent. At step 610, the computing device may optionally train a machine learning model for the endpoint security agent, which may enable the machine learning model to distinguish between authorized use of the computing device and unauthorized use of the computing device. At step 615, the computing device may optionally determine whether the initial learning period is complete. If the initial learning period is not complete, the computing device may return to step 610 and continue to train the machine learning model. If the initial learning period is complete, the computing device may proceed to step 620.

At step 620, the computing device may collect data. At step 630, the computing device may determine whether use of the computing device is authorized or unauthorized. If the use is authorized, the computing device may return to step 620. If the use is unauthorized, the computing device may proceed to step 635.

At step 635, the computing device may identify whether or not a connection to an enterprise server is established. If a connection is not established to an enterprise server, the computing device may proceed to step 650. If a connection is established with an enterprise server, the computing device may proceed to step 640.

At step 640, the computing device may generate a security notification. At step 645, the computing device may send the security notification to the enterprise server. At step 650, the computing device may execute one or more security actions.

The following paragraphs (M1) through (M8) describe examples of methods that may be implemented in accordance with the present disclosure.

(M1) A method comprising receiving data indicative of usage of the computing device by a user; comparing the received data with other data stored on the computing device to identify instances of abnormal usage of the computing device, the other data indicative of how an authorized user for that computing device uses the computing device; detecting unauthorized use of the computing device based on the number of instances of abnormal usage exceeding a threshold; and preventing access to a computing environment with use of the computing device in response to detection of unauthorized use.

(M2) A method may be performed as described in paragraph (M1) further comprising receiving the other data, wherein receiving the other data comprises receiving data corresponding to one or more metrics, and wherein the one or more metrics comprise one or more of: location data or information indicating interactions of the authorized user with an application on the computing device.

(M3) A method may be performed as described in paragraph (M2) wherein the one or more metrics are selected based on a job title of the authorized user of the computing device.

(M4) A method may be performed as described in paragraph (M2) further comprising training, using the other data stored on the computing device, a machine learning model, wherein training the machine learning model configures the machine learning model to distinguish use of the computing device by the authorized user of the computing device from use of the computing device by an unauthorized user of the computing device.

(M5) A method may be performed as described in paragraph (M4) wherein training the machine learning model comprises: computing, for each of the one or more metrics, a weight value, wherein the weight values indicate how relevant each of the one or more metrics are to identifying unauthorized access to the computing device.

(M6) A method may be performed as described in paragraph (M5) wherein computing the weight values comprises: computing, for a first metric of the one or more metrics and based on a first average deviation value of the initial data corresponding to the first metric, a first weight value; and computing, for a second metric of the one or more metrics and based on a second average deviation value of the initial data corresponding to the second metric, a second weight value, and wherein: the first average deviation value is lower than the second average deviation value, and the first weight value is larger than the second weight value.

(M7) A method may be performed as described in any of paragraphs (M5) through (M6), further comprising comparing the weight values to a predetermined metric selection threshold; determining that a subset of the weight values do not exceed the predetermined metric selection threshold; and removing, from the machine learning model, initial data corresponding to metrics affiliated with the subset of the weight values.

(M8) A method may be performed as described in any one of paragraphs (M4) through (M7), wherein training the machine learning model comprises establishing, based on the other data and for the one or more metrics, one or more metric thresholds that separate other data corresponding to each of the one or more metrics into subgroups for the corresponding one or more metrics, and wherein comparing the received data to the other data comprises: filtering the received data based on the one or more metric thresholds; and comparing the received data for each of the one or more metric thresholds with the other data for the corresponding metric thresholds of the one or more metric thresholds.

The following paragraphs (A1) through (A11) describe examples of an apparatus that may be implemented in accordance with the present disclosure.

(A1) An apparatus comprising at least one processor; memory storing computer-readable instructions that, when executed by the at least one processor, cause the computing device to: receive data indicative of usage of the computing device by a user; compare the received data with other data stored on the computing device to identify instances of abnormal usage of the computing device, the other data indicative of how an authorized user for that computing device uses the computing device; detect unauthorized use of the computing device based on the number of instances of abnormal usage exceeding a threshold; and prevent access to a computing environment with use of the computing device in response to detection of unauthorized use.

(A2) An apparatus as described in paragraph (A1) wherein the memory stores additional computer-readable instructions that, when executed by the at least one processor, further cause the computing device to: receive the other data, wherein receiving the other data comprises receiving data corresponding to one or more metrics, and wherein the one or more metrics comprise one or more of: location data or information indicating interactions of the authorized user with an application on the computing device.

(A3) An apparatus as described in paragraph (A2), wherein the one or more metrics are selected based on a job title of the authorized user of the computing device.

(A4) An apparatus as described in any one of paragraphs (A2) through (A3), wherein the memory stores additional computer-readable instructions that, when executed by the at least one processor, further cause the computing device to: train, using the other data stored on the computing device, a machine learning model, wherein training the machine learning model configures the machine learning model to distinguish use of the computing device by the authorized user of the computing device from use of the computing device by an unauthorized user of the computing device.

(A5) An apparatus as described in paragraph (A4) wherein training the machine learning model comprises: computing, for each of the one or more metrics, a weight value, wherein the weight values indicate how relevant each of the one or more metrics are to identifying unauthorized access to the computing device.

(A6) An apparatus as described in paragraph (A5), wherein computing the weight values comprises: computing, for a first metric of the one or more metrics and based on a first average deviation value of the initial data corresponding to the first metric, a first weight value; and computing, for a second metric of the one or more metrics and based on a second average deviation value of the initial data corresponding to the second metric, a second weight value, and wherein: the first average deviation value is lower than the second average deviation value, and the first weight value is larger than the second weight value.

(A7) An apparatus as described in any one of paragraphs (A5) through (A6), wherein the memory stores additional computer-readable instructions that, when executed by the at least one processor, further cause the computing device to: compare the weight values to a predetermined metric selection threshold; determine that a subset of the weight values do not exceed the predetermined metric selection threshold; and remove, from the machine learning model, initial data corresponding to metrics affiliated with the subset of the weight values.

(A8) An apparatus as described in any one of paragraphs (A4) through (A7), wherein training the machine learning model comprises establishing, based on the other data and for the one or more metrics, one or more metric thresholds that separate other data corresponding to each of the one or more metrics into subgroups for the corresponding one or more metrics, and wherein comparing the received data to the other data comprises: filtering the received data based on the one or more metric thresholds; and comparing the received data for each of the one or more metric thresholds with the other data for the corresponding metric thresholds of the one or more metric thresholds.

(A9) An apparatus as described in any one of paragraphs (A2) through (A8) wherein detecting the unauthorized use of the computing device comprises: computing, based on the comparison of the received data to the other data, a weighted security score, wherein computing the weighted security score comprises: identifying, for each metric and based on a difference between the received data and the other data, whether the received data for the corresponding metric indicates unauthorized use of the computing device, computing, for metrics indicating possible unauthorized use of the computing device, a first set of weighted metric scores using the formula: weighted metric score=−1×corresponding weighted value, computing, for metrics indicating authorized use of the computing device, a second set of weighted metric scores equal to the corresponding weighted values, and computing, by adding the first set of weighted metric scores and the second set of weighted metric scores, a weighted security score; and in response to determining that the weighted security score is a negative value, determining that the computing device is being used in an unauthorized manner.

(A10) An apparatus as described in any one of paragraphs (A1) through (A9) wherein preventing access to the computing environment with the use of the computing device comprises one or more of: deleting data from the computing device, disabling an authentication token, or prompting for re-authentication.

(A11) An apparatus as described in paragraph (A10), wherein preventing access to the computing environment is in response to determining that a connection between the computing device and an enterprise server is unavailable for communication.

The following paragraph (CRM1) describes examples of computer-readable media that may be implemented in accordance with the present disclosure.

(CRM1) A non-transitory computer-readable medium storing instructions that, when executed, cause a system to receive data indicative of usage of the computing device by a user; compare the received data with other data stored on the computing device to identify instances of abnormal usage of the computing device, the other data indicative of how an authorized user for that computing device uses the computing device; detect unauthorized use of the computing device based on the number of instances of abnormal usage exceeding a threshold; and prevent access to a computing environment with use of the computing device in response to detection of unauthorized use.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:
at least one processor;
memory storing computer-readable instructions that, when executed by the at least one processor, cause the computing device to:
receive data indicative of usage of the computing device by a user;
compare the received data with other data corresponding to one or more metrics stored on the computing device to identify instances of abnormal usage of the computing device, the other data indicative of how an authorized user for that computing device uses the computing device, wherein the one or more metrics comprise one or more of: location data or information indicating interactions of the authorized user with an application on the computing device;
detect unauthorized use of the computing device based on the number of instances of abnormal usage exceeding a threshold, wherein detecting the unauthorized use of the computing device comprises:
identifying, for each metric of the one or more metrics and based on the comparison of the received data with the other data, whether the received data for the corresponding metric indicates unauthorized use of the computing device;
computing, using negative weighted values for metrics indicating possible unauthorized use of the computing device, a first set of weighted metric scores;
computing, using positive weighted values for metrics indicating authorized use of the computing device, a second set of weighted metric scores;
computing, by adding the first set of weighted metric scores and the second set of weighted metric scores, a weighted security score, wherein a nonnegative weighted security score indicates authorized use of the computing device and a negative weighted security score indicates unauthorized use of the computing device; and
in response to determining that the weighted security score is a negative value, determining that the computing device is being used in an unauthorized manner; and
prevent access to a computing environment with use of the computing device in response to detection of unauthorized use.

2. The computing device of claim 1, wherein the memory stores additional computer-readable instructions that, when executed by the at least one processor, further cause the computing device to:
receive the other data, wherein receiving the other data comprises receiving data corresponding to the one or more metrics.

3. The computing device of claim 2, wherein the one or more metrics are selected based on a job title of the authorized user of the computing device.

4. The computing device of claim 2, wherein the memory stores additional computer-readable instructions that, when executed by the at least one processor, further cause the computing device to:
train, using the other data stored on the computing device, a machine learning model, wherein training the machine learning model configures the machine learning model to distinguish use of the computing device by the authorized user of the computing device from use of the computing device by an unauthorized user of the computing device.

5. The computing device of claim 4, wherein the memory stores additional computer-readable instructions that, when executed by the at least one processor, cause the computing device to train the machine learning model by:
computing, for the one or more metrics, weighted values indicating how relevant each of the one or more metrics is to identifying unauthorized access to the computing device.

6. The computing device of claim 5, wherein the memory stores additional computer-readable instructions that, when executed by the at least one processor, cause the computing device to compute the weighted values by:
computing, for a first metric of the one or more metrics and based on a first average deviation value of initial data corresponding to the first metric, a first weighted value; and
computing, for a second metric of the one or more metrics and based on a second average deviation value of initial data corresponding to the second metric, a second weighted value, and wherein:
the first average deviation value is lower than the second average deviation value, and the first weighted value is larger than the second weighted value.

7. The computing device of claim 5, wherein the memory stores additional computer-readable instructions that, when executed by the at least one processor, further cause the computing device to:
   compare the weighted values to a predetermined metric selection threshold;
   determine that a subset of the weighted values do not exceed the predetermined metric selection threshold; and
   remove, from the machine learning model, initial data corresponding to metrics affiliated with the subset of the weighted values.

8. The computing device of claim 4, wherein the memory stores additional computer-readable instructions that, when executed by the at least one processor, cause the computing device to train the machine learning model by:
   establishing, based on the other data and for the one or more metrics, one or more metric thresholds that separate other data corresponding to each of the one or more metrics into subgroups for the corresponding one or more metrics, and
   wherein the memory stores additional computer-readable instructions that, when executed by the at least one processor, cause the computing device to compare the received data to the other data by:
      filtering the received data based on the one or more metric thresholds; and
      comparing the received data for each of the one or more metric thresholds with the other data for the corresponding metric thresholds of the one or more metric thresholds.

9. The computing device of claim 1, wherein the memory stores additional computer-readable instructions that, when executed by the at least one processor, cause the computing device to prevent access to the computing environment with the use of the computing device by performing one or more of: deleting data from the computing device, disabling an authentication token, or prompting for re-authentication.

10. The computing device of claim 9, wherein the memory stores additional computer-readable instructions that, when executed by the at least one processor, cause the computing device to prevent access to the computing environment in response to determining that a connection between the computing device and an enterprise server is unavailable for communication.

11. A method comprising:
   receiving, by a computing device, data indicative of usage of the computing device by a user;
   comparing the received data with other data corresponding to one or more metrics stored on the computing device to identify instances of abnormal usage of the computing device, the other data indicative of how an authorized user for that computing device uses the computing device, wherein the one or more metrics comprise one or more of: location data or information indicating interactions of the authorized user with an application on the computing device;
   detecting unauthorized use of the computing device based on the number of instances of abnormal usage exceeding a threshold, wherein detecting the unauthorized use of the computing device comprises:
   identifying, for each metric of the one or more metrics and based on the comparison of the received data with the other data, whether the received data for the corresponding metric indicates unauthorized use of the computing device;
   computing, using negative weighted values for metrics indicating possible unauthorized use of the computing device, a first set of weighted metric scores;
   computing, using positive weighted values for metrics indicating authorized use of the computing device, a second set of weighted metric scores;
   computing, by adding the first set of weighted metric scores and the second set of weighted metric scores, a weighted security score, wherein a nonnegative weighted security score indicates authorized use of the computing device and a negative weighted security score indicates unauthorized use of the computing device; and
   in response to determining that the weighted security score is a negative value, determining that the computing device is being used in an unauthorized manner; and
   preventing access to a computing environment with use of the computing device in response to detection of unauthorized use.

12. The method of claim 11, further comprising:
   receiving the other data, wherein receiving the other data comprises receiving data corresponding to the one or more metrics.

13. The method of claim 12, wherein the one or more metrics are selected based on a job title of the authorized user of the computing device.

14. The method of claim 12, further comprising:
   training, using the other data stored on the computing device, a machine learning model, wherein training the machine learning model configures the machine learning model to distinguish use of the computing device by the authorized user of the computing device from use of the computing device by an unauthorized user of the computing device.

15. The method of claim 14, wherein training the machine learning model comprises:
   computing, for the one or more metrics, weighted values indicating how relevant each of the one or more metrics is to identifying unauthorized access to the computing device.

16. The method of claim 15, wherein computing the weighted values comprises:
   computing, for a first metric of the one or more metrics and based on a first average deviation value of initial data corresponding to the first metric, a first weighted value; and
   computing, for a second metric of the one or more metrics and based on a second average deviation value of initial data corresponding to the second metric, a second weighted value, and wherein:
      the first average deviation value is lower than the second average deviation value, and
      the first weighted value is larger than the second weighted value.

17. The method of claim 15, further comprising:
   comparing the weighted values to a predetermined metric selection threshold;
   determining that a subset of the weighted values do not exceed the predetermined metric selection threshold; and
   removing, from the machine learning model, initial data corresponding to metrics affiliated with the subset of the weighted values.

18. The method of claim 14, wherein training the machine learning model comprises establishing, based on the other data and for the one or more metrics, one or more metric thresholds that separate other data corresponding to each of the one or more metrics into subgroups for the corresponding one or more metrics, and
- wherein comparing the received data to the other data comprises:
    - filtering the received data based on the one or more metric thresholds; and
    - comparing the received data for each of the one or more metric thresholds with the other data for the corresponding metric thresholds of the one or more metric thresholds.

19. One or more non-transitory computer-readable media storing instructions that, when executed by a computing device comprising at least one processor, a communication interface, and memory, cause the computing device to:
- receive data indicative of usage of the computing device by a user;
- compare the received data with other data corresponding to one or more metrics stored on the computing device to identify instances of abnormal usage of the computing device, the other data indicative of how an authorized user for that computing device uses the computing device, wherein the one or more metrics comprise one or more of: location data or information indicating interactions of the authorized user with an application on the computing device;
- detect unauthorized use of the computing device based on the number of instances of abnormal usage exceeding a threshold, wherein detecting the unauthorized use of the computing device comprises:
- identifying, for each metric of the one or more metrics and based on the comparison of the received data with the other data, whether the received data for the corresponding metric indicates unauthorized use of the computing device;
- computing, using negative weighted values for metrics indicating possible unauthorized use of the computing device, a first set of weighted metric scores;
- computing, using positive weighted values for metrics indicating authorized use of the computing device, a second set of weighted metric scores;
- computing, by adding the first set of weighted metric scores and the second set of weighted metric scores, a weighted security score, wherein a nonnegative weighted security score indicates authorized use of the computing device and a negative weighted security score indicates unauthorized use of the computing device; and
- in response to determining that the weighted security score is a negative value, determining that the computing device is being used in an unauthorized manner; and
- prevent access to a computing environment with use of the computing device in response to detection of unauthorized use.

* * * * *